(12) United States Patent
Gehman

(10) Patent No.: US 7,457,905 B2
(45) Date of Patent: Nov. 25, 2008

(54) METHOD FOR REQUEST TRANSACTION ORDERING IN OCP BUS TO AXI BUS BRIDGE DESIGN

(75) Inventor: Judy Gehman, Ft. Collins, CO (US)

(73) Assignee: LSI Corporation, Milpitas, CA (US)

( * ) Notice: Subject to any disclaimer, the term of this patent is extended or adjusted under 35 U.S.C. 154(b) by 98 days.

(21) Appl. No.: 11/490,691

(22) Filed: Jul. 20, 2006

(65) Prior Publication Data

US 2007/0067549 A1 Mar. 22, 2007

Related U.S. Application Data

(60) Provisional application No. 60/712,304, filed on Aug. 29, 2005.

(51) Int. Cl.
*G06F 13/36* (2006.01)
(52) U.S. Cl. .................. 710/315; 710/105; 710/305; 710/306; 710/100
(58) Field of Classification Search ................ 710/315, 710/4, 11, 100, 310, 305–306, 105
See application file for complete search history.

(56) References Cited

U.S. PATENT DOCUMENTS

2007/0168645 A1* 7/2007 Grabner et al. ................. 712/24
2007/0234006 A1* 10/2007 Radulescu et al. ............. 712/28

* cited by examiner

*Primary Examiner*—Khanh Dang
*Assistant Examiner*—Kim T Huynh
(74) *Attorney, Agent, or Firm*—Ortiz & Lopez PLLC; Luis M. Ortiz; Kermit D. Lopez

(57) ABSTRACT

A request transaction ordering method and system includes designing of the Open Core Protocol (OCP) bus to an Advanced extensible Interface (AXI) bus bridge. The general flow of the bridge is to accept a plurality of read and write requests from the OCP bus and convert them to a plurality of AXI read and write requests. Control logic is set for each first in first out policy of push and pop control and for a plurality of handshake signals in OCP and in the AXI. The request ordering part of the bridge performs hazard checking to preserve required order policies for both OCP and AXI bus protocols by using a FIFO (first in first out) policy to hold the outstanding writes, a plurality of comparators, a first in first out policy to hold OCP identities for a plurality of read requests.

20 Claims, 7 Drawing Sheets

METHOD FOR REQUEST TRANSACTION ORDERING IN OCP BUS TO AXI BUS BRIDGE DESIGN

CROSS-REFERENCE TO PROVISIONAL PATENT APPLICATION

This patent application claims priority to U.S. Provisional Patent Application Ser. No. 60/712,304 entitled "Method for Request Transaction Ordering in OCP Bus to AXI Bus Bridge Design," which was filed on Aug. 29, 2005, the disclosure of which is incorporated herein by reference in its entirety.

TECHNICAL FIELD

Embodiments are generally related to data-processing methods and systems. Embodiments are also related to Open Core Protocol (OCP) bus configurations and microcontroller bus architectures. Embodiments are additionally related to Advanced extensible Interface (AXI) bus bridge designs, and request transaction ordering operations used in OCP bus to AXI bus bridge designs.

BACKGROUND OF THE INVENTION

Many processes and devices have been used to implement request transaction ordering applications over the past several years. The technical aspects of how an OCP (Open Core Protocol) specification, however, interacts with an AXI (Advanced Extensible Interface) bridge do not enable the design of transaction systems with request ordering policies. An OCP-to-AXI bridge interface allows an OCP master module to access an AXI slave module or an AXI interconnect fabric. The OCP specification allows OCP devices to be compliant to the OCP specification, but may not be compatible with each other. The OCP-to-AXI bridge has targeted the MIPS Technologies, Inc. MIPS32® 24Kf™ processor core usage of OCP revision 2.0 and release candidate 2.1 specifications. Any other OCP master may use this bridge if it is OCP compatible.

The main feature of the OCP-to-AXI Bridge includes uni-directional data transfer capabilities. The 64-bit OCP port generally includes a compliant slave interface while the 64-bit AXI port generally includes a compliant master interface. An OCP master such as a MIPS32 24Kf can connect seamlessly to an AXI slave with the assistance of a synchronous bridge with one clock input and one reset input. This connection can support 1:1 clocking on the OCP side and an N:1 clock on the AXI side (i.e., AXI same or slower frequency as OCP). The OCP-to-AXI bridge supports signal processing commands such as, for example, OCP idle, write, and read commands. The OCP-to-AXI bridge also supports OCP incrementing, wrapping, streaming bursts, OCP data valid or accept commands, error responses, 1-16 data beats per burst, OCP precise bursts, OCP single request/multiple data burst modes and byte enable patterns having a power-of-two size in addition to an alignment to that size, for compatibility with MIPS32 24Kf processor simple byte enable modes.

The OCP bus follows the Open Core Protocol specification maintained by the Open Core Protocol International Partnership (OCP-IP™), which is a trade organization solely dedicated to OCP supporting products and services. The OCP standard is a non-proprietary openly licensed core-centric protocol that describes the system-level integration requirements of intellectual property (IP) cores. The AXI bus is a part of the AMBA protocol from ARM Limited. The AMBA standard includes the AXI, Advanced High-performance Bus (AHB), and Advanced Peripheral Bus (APB) bus specifications.

An RISC (Reduced Instruction Set Computer) processor family generally uses a bus architecture such as an OCP to access memories and peripheral devices. One example of such a processor family is produced by MIPS Technologies, Inc. LSI Logic CoreWare®, for example, utilizes a technology to support several different processors and peripheral devices. Usually such processors rely upon different common bus architectures to access their memory space. Reference design systems, however, have been developed that enable users to quickly utilize a processor with their designs. While building a reference design for the MIPS processor, the existing AMBA peripherals can be used with the MIPS processor when using an OCP-to-AXI bridge.

A problem was discovered during the designing of OCP-to-AXI bridge configurations in which re-ordering policies for requests used by the OCP specification of MIPS32 24Kf processor and AXI specifications were different. The OCP protocol uses one request phase that is shared by both read and write requests. Generally, support is provided by the MIPS32 24Kf processor for read and writes responses to be received in a different order than the requests sent. The AXI protocol has five independent channels, including a read address channel, a write address channel, a write data channel, a write response channel, and a read data channel. The read and write channels are independent so that read and write data can respectively reach their final destination in a different order than the original requests. The re-ordering rules between OCP and AXI protocols are different. The OCP requires the target device to resolve hazards while the AXI protocol requires the master device to resolve hazards. Moreover, the OCP-to-AXI Bridge should preferably ensure that the different ordering policies on both buses are well maintained.

Referring to FIG. 1, a block diagram of a prior art system 100 is illustrated indicative of an OCP-to-AXI bridge configuration that includes a MIPS24k 102 connected with an OCP bus 104 for signal transformation. The OCP bus 104 is further connected to an OCP fabric 106. The OCP fabric 106 is further colligated via an OCP bus 104 and an OCP slave 108. The OCP fabric 106 is linked to another OCP bus and an OCP wrapper 110 wherein an AMBA slave 112 is present.

To enable the reuse of AMBA peripherals, a solution is required to bridge the MIPS's OCP bus interface to the AMBA peripheral's bus interface. Such a solution would allow the peripherals to be reused without consuming valuable resources and time in modifying and verifying each individual peripheral in AMBA library to an OCP bus specification. This open core protocol to advanced extensible interface bridging systems has been referred to as an OCP-to-AXI bus bridge.

One solution to these problems may be the re-design of all slave peripherals, thereby using the same bus standard as the MIPS core, which is OCP-compatible and would eliminate the need for a bridge. Each individual slave peripheral would need modification following an OCP and MIPS32 24Kf processor request ordering policies. Moreover, each peripheral would need to be verified in a new test environment for the OCP protocol. The principles of design reuse are not used in existing approaches. The peripherals in the entire AMBA library would need their bus interfaces redesigned or at minimum an OCP wrapper added and the peripherals being re-verified. Thus, there is a need to re-design existing systems for enhanced functionality and efficiency.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data-processing system and method.

It is another aspect of the present invention to provide for improved data-processing system components that incorporate the use of OCP (Open Core Protocol) and AXI (Advanced extensible Interface) architectures.

It is also an aspect of the present invention to provide for an OCP bus to AXI bus bridge design.

It is a further aspect of the present invention to provide for a method of request transaction ordering in OCP bus to AXI bus bridge designs.

The aforementioned aspects and other objectives and advantages can now be achieved as described herein. An OCP-to-AXI bus bridge can be provided as a unidirectional synchronous bridge. Such a bridge comprises an OCP compliant slave interface and an AXI compliant master interface. The OCP configuration is set and designed for a processor, such as an MIPS32 24Kf processor. The general flow of the bridge involves accepting read and write requests from the OCP bus and thereby converting such signals to AXI read and write requests.

The present invention allows existing AMBA peripherals to be reused and supports a reusable methodology between processors. The disclosed embodiments solve issues related to request reordering policies such that bus protocols are satisfied without violations. Such embodiments provide read requests that do not conflict with outstanding write requests without waiting. This can enhance processor performance for instructions fetched to a different location than any of the outstanding writes. Additionally, the disclosed embodiments assist the processor to avoid stalling and therefore help the overall performance of the system. The bridge can be designed as an OCP-to-AXI design, instead of an OCP-to-AHB in order to take advantage of the AXI's overall features and performance improvements for streaming data before bridging to an AHB.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
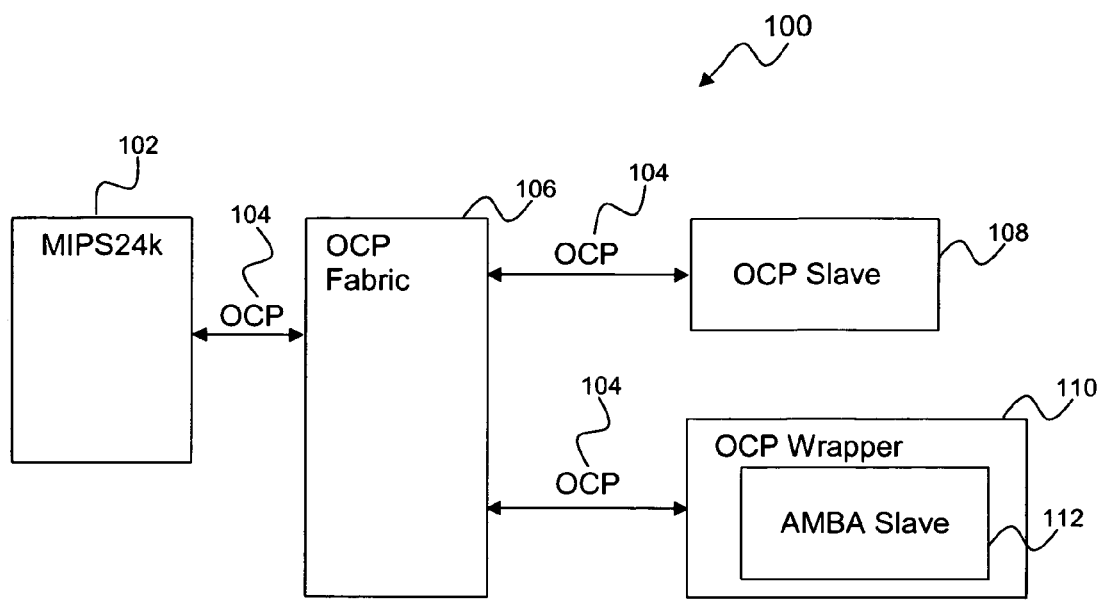
FIG. 1 illustrates a block diagram of a prior art OCP-to-AXI bridge configuration for use in a transaction system.

The particular values and configurations discussed in these non-limiting examples can be varied and are cited merely to illustrate at least one embodiment and are not intended to limit the scope thereof.

The request ordering schemes are different for the OCP and AXI bus protocols. The OCP places restrictions and responsibilities on the OCP slave devices while the AXI places responsibilities on the AXI master devices. The OCP to AXI bridge is an OCP slave and an AXI master. This bridge had to resolve these request ordering issues. The AXI order rules are as follows: Transactions with different AXI ID values have no ordering restrictions; Writes with same AWID must be completed in order; Read with same ARID must be completed in order; No ordering restriction between read and writes with same ID's. If an AXI master cares about the order, the master must ensure the earlier transaction is complete before issuing the later transaction. For a write followed by a read, this means a non-buffered write should be used so that a response is returned.

The OCP revision 2.0 and release candidate 2.1 order rules are as follows: Transfers within a single thread must remain ordered (rev 2.0); Transfers within a single thread must remain ordered or follow the tag ordering rules (rev 2.1). Transfers in a single thread can be reordered using tags only if MTagInOrder and STagInOrder signals are de-asserted (rev 2.1). No ordering rules for transfers that are in different threads (rev 2.0 and rev 2.1).

The MIPS32 24Kf processor is really a single threaded, multiple transactions device. The processor uses multiple thread (OCP rev 2.0) or tag IDs (OCP rev 2.1) on the OCP bus to track the multiple transactions. In the use of multiple threads, the MIPS32 24Kf processor is stricter than the OCP protocol it is using. MIPS was instrumental in the OCP 2.1 update for the addition of the use of multiple tag IDs per single thread. The MIPS32 24Kf processor order rules are as follows: No defined general mechanism for completing OCP transactions out of order. MIPS32 24Kf revision 3.x using OCP 2.1 statically drives MTaginOrder as 0×0 meaning requests on the same thread can be reordered, but hazard checking is the responsibility of the target (slave). The interconnect and target (slave) can reorder transactions ONLY if they take on the responsibility of resolving hazards/dependencies. A simple implementation of OCP interconnect is to not let the interconnect reorder the transactions. For a read request followed by a write request ordering, the MIPS32 24Kf will not start a write request if a read to the same address within the same 32 byte line is outstanding. It will wait for the read response. For write request followed by a read request ordering, the MIPS32 24Kf may start a read to the same address as an outstanding write. Since all writes are posted, there is no write response. The MIPS32 24Kf will expect the write data for the read response.

To prevent the AXI slave devices from re-ordering transactions to the same address, the following rules can be used by the OCP-to-AXI bridge. In general, all AXI IDs are identical to prevent reads from being re-ordered and writes from being re-ordered. Additionally, all OCP MTagIDs for reads are saved in an ID FIFO so they can be returned with the read data/response. Since reads are not allowed to be re-ordered, the tag IDs can be kept for use by a simple FIFO. As a read response is received, the next ID is popped off the FIFO and returned to the OCP master. All OCP posted writes (no response expected) are converted to AXI non-buffered writes (response expected) in order for the OCP-to-AXI bridge to receive write responses after the write has been truly completed to the AXI slave. This ensures the write has completed before the OCP-to-AXI bridge issues an AXI read request. The end goal is to make certain that transactions are ordered. The only way the next transaction can be issued is to ensure that the previous has completed (via the response). On a write followed by a read, a hazard check of addresses is done. If the transactions overlap addresses, the write transaction's response must be completed before the read transaction's request can be issued. If the addresses do not overlap, the read transaction's request can be sent after the write transaction's request without waiting for the write transaction's response. This hazard check allows a performance improvement over having all reads wait for outstanding writes to complete. OCP MTagInOrder setting of one to force order is not supported since commands outside of the hazard range can be reordered by the AXI fabric or slave.

The hazard check is done for read requests to outstanding write requests. This requires storage of all outstanding write requests addresses. A hazard check for write requests to outstanding read request addresses is not done because the MIPS32 24Kf will not issue a write request that has a hazard with an outstanding read request. If using a different OCP master with the OCP-to-AXI bridge, this master must also perform write request to outstanding read requests hazard checking or the OCP-to-AXI bridge must be modified by implementing the storage of all outstanding read request addresses and performing at least one hazard check for write requests. The hazard checking is performed as a range without looking at the burst sequence type. If the second transaction's address falls within 16 data beats (maximum burst length supported) plus or minus of the first transaction's address, the 2nd transaction's request will not be sent until the first transaction's response as been received. To do the compare the lower 7 bits of the address are discarded and bits 31:8 are compared.

If the user's system has hazards that fall outside of the OCP-to-AXI bridge's hazard checking algorithm, the user's software or the endpoint AXI slave will have to resolve this hazard. An example of this is if an OCP master needs to write a particular location/peripheral and then read a different location/peripheral and maintain this relationship for proper system functionality. For example clearing of an interrupt before accessing another location/peripheral. If the location's/peripheral's addresses fall outside the hazard check range, the OCP-to-AXI bridge will send the read request before receiving the write response. Therefore the read could be executed before the write.

Another solution to the request ordering problem that was considered would be to allow all reads OR all writes to be issued to the AXI bus as they come in. Whenever a request pattern from the OCP master changed types of requests (read->write or write->read), the bridge must wait for all of the first transaction type's response(s) before sending the second transaction's request. The performance of a processor subsystem would be drastically affected by this method. If a processor was performing a data write and needed to do an instruction fetch to a completely different location, the processor would be stalled until the data write completed. This is why the complexity of the outstanding write address FIFO to save write addresses, comparators for hazard checking and ID FIFO for saving OCP MTagIDs for reads are important for the design.

Figure 2:
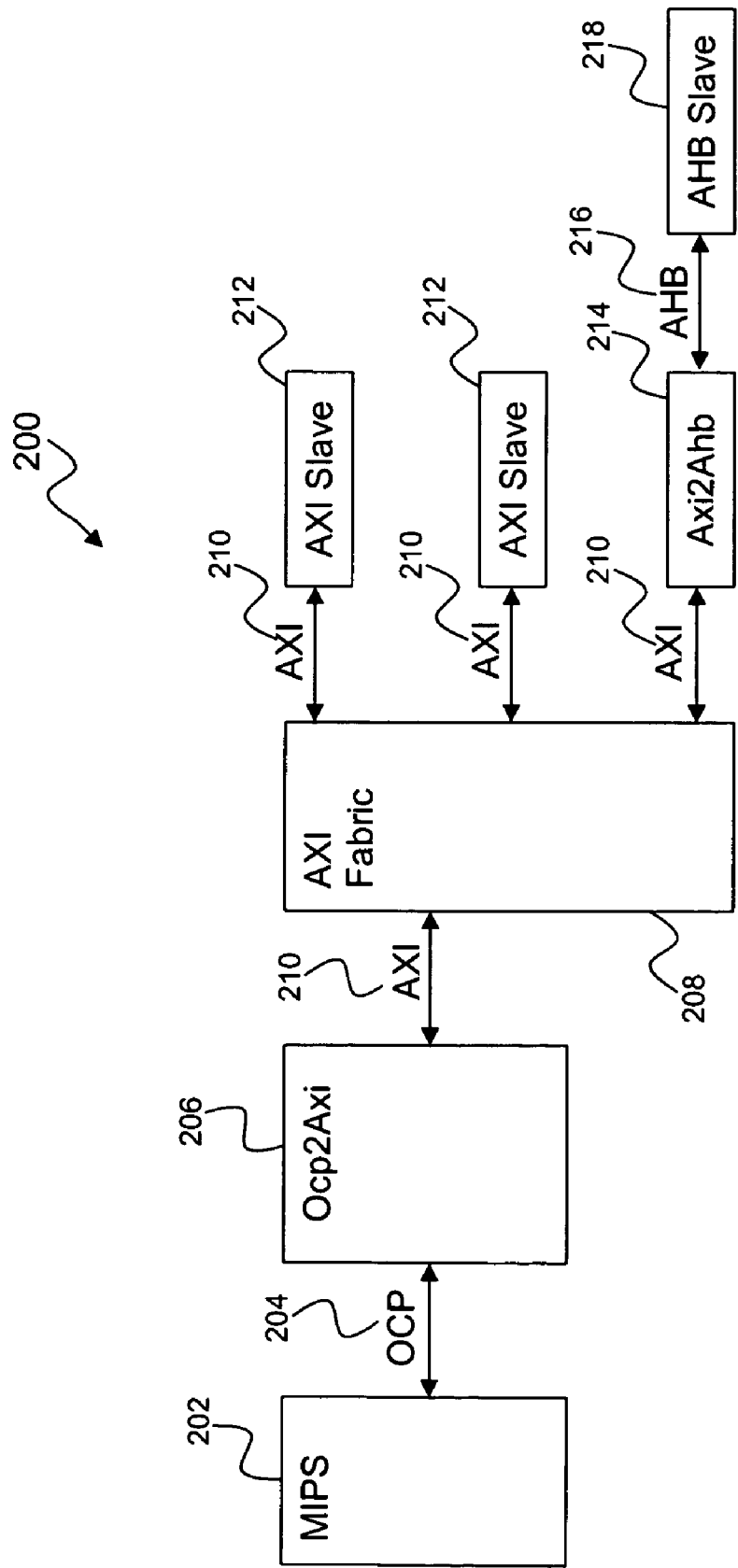
FIG. 2 illustrates a schematic diagram of an OCP-to-AXI bridge configuration for use in request transaction ordering in OCP bus to AXI bus bridge designs, in accordance with a preferred embodiment.

Referring now to the drawings and in particular to FIG. 2, a schematic diagram of an OCP-to-AXI bridge system 200 utilized in request transaction ordering in OCP bus to AXI bus bridge designs is illustrated, which can be implemented in accordance with a preferred embodiment. The System 200 includes a MIPS processor 202 that is connected to an OCP bus 204 and then to an OCP-to-AXI bridge 206, that can be used to accept read and write requests from the OCP bus and convert them to AXI read and write requests. By using the OCP-to-AXI bridge interface 206, the AXI bus 210 to AXI fabric 208 configuration of system 200 can be attained for the transformation of signals. The AXI fabric 208 can be then connected via the AXI bus 210 to AXI slave units 212 and to an AXI-to-AHB (Axi2Ahb) interfacing unit 214. An AXI-to-AHB interfacing unit 214 can be then connected to an AHB bus 216, and then interfaced to an AHB slave interface 218.

Figure 3:
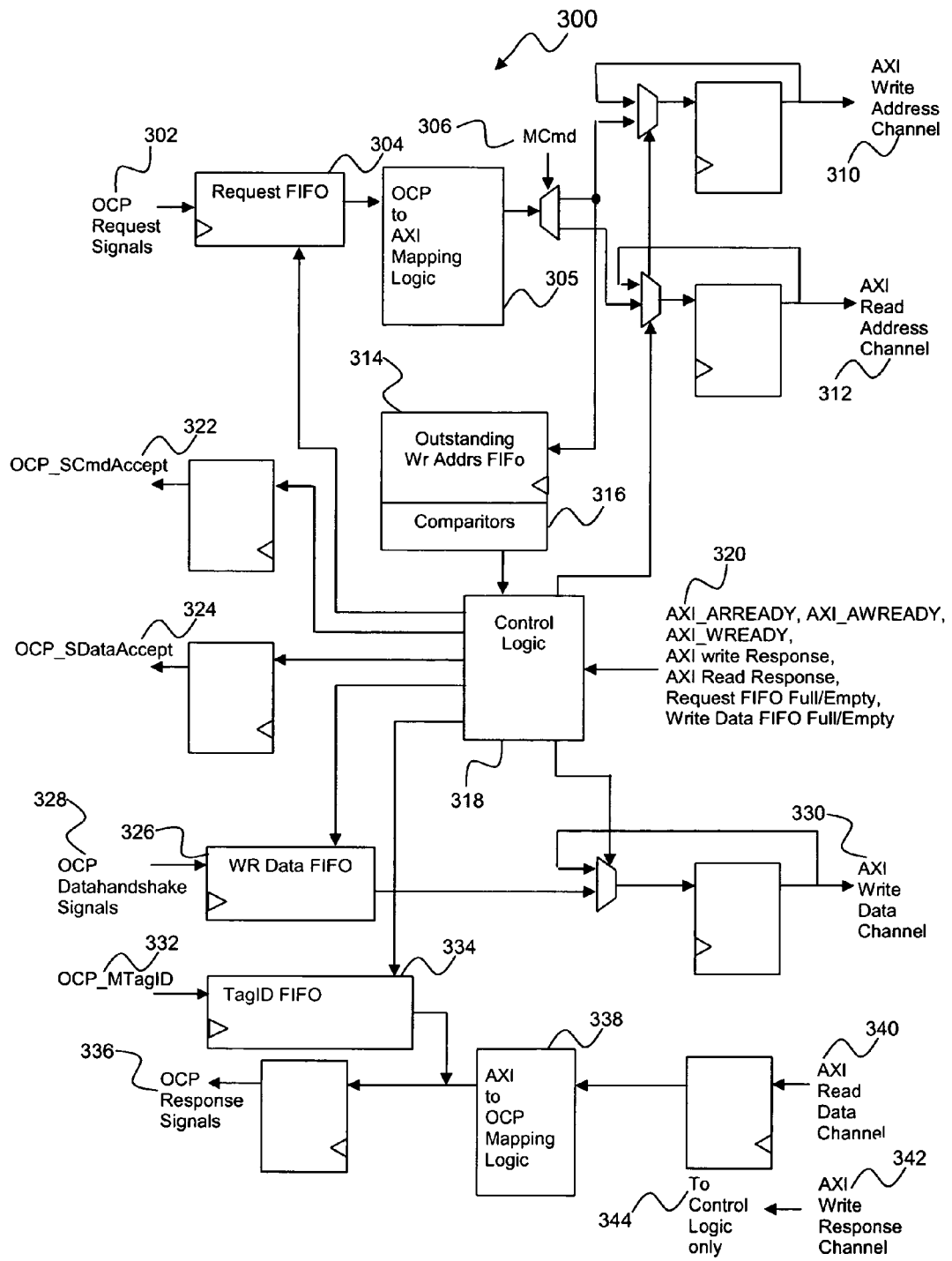
FIG. 3 illustrates a block diagram of an OCP-to-AXI bridge for use in request transaction ordering in OCP bus to AXI bus bridge designs, in accordance with a preferred embodiment.

FIG. 3 illustrates a block diagram of an OCP-to-AXI bridge system 300 for request transaction ordering in OCP bus to AXI bus bridge designs, in accordance with a preferred embodiment. The general flow of the OCP-to-AXI bridge 300 involves accepting read and write request from the OCP bus 302 and converting such requests to AXI read and write requests. The OCP-to-AXI bridge converts the OCP protocol to AXI protocol, and includes an OCP slave and an AXI master. The OCP request phase address and control information can be immediately placed in a FIFO structure 304 when the request is received, and then be reformatted to an AXI protocol 305. The OCP to AXI mapping logic 305 forces all writes to be un-buffered in order to receive a response and all read and write address IDs to be identical to force order of all requests.

The OCP request phase address and control information can be then driven onto either an AXI read address channel 312 or onto an AXI write address channel 310. An OCP_MCmd 306 information signal can be used to steer the request to a correct AXI channel. The Request FIFO 304 is generally used to store OCP requests when received. If an AXI slave is busy, it will wait the OCP-to-AXI bridge 300 using an AXI_AWREADY signal 320 or an AXI_ARREADY signal 320 based on the requests received. The Request FIFO 304 is also used to store the requests when a request can't be sent to the AXI bus because of protocol reasons. The depth of the Request FIFO 304 is sized to allow the OCP-to-AXI bridge to store all OCP request information when the AXI slave wait states are passed on to the OCP bus.

A full indication signal from the Request FIFO 304 is used to provide a wait signal for an OCP master by using an OCP_SCmdAccept signal 322. The OCP requests are pulled out of Request FIFO 304 as soon as the Request FIFO 304 is non-empty. Usually, the bridge does not wait for the FIFO to be filled. The bridge 300 will always accept requests if the Request FIFO 304 has room.

The write data from the OCP Data handshake signals 328 phase can then be transferred from the OCP master to the AXI Write Data Channel 330 using the same manner as the OCP request phase 302 by using a WR Data FIFO 326. The depth of the WR Data FIFO 326 is sized to allow the OCP-to-AXI bridge to store OCP write data when the AXI slave wait state is passed on to the OCP bus. The WR Data FIFO 326 full indication is also used to give wait signal for an OCP master by using an OCP_SDataAccept signal 324. The WR Data FIFO 326 can be used to capture OCP data while an AXI slave wait state occurs. The AXI write data channel IDs are force to be identical to the write address channel IDs for the ordering policy rules. The OCP slave of the OCP-to-AXI bridge 300 can be connected and set for not providing responses for any write requests that are sent. In this case the AXI write response channel information 342 will not be transferred to an OCP master. This is because the MIPS processor usually targeted always issues posted writes where no responses are expected.

The AXI Read Data Channel 340 information can be provided to an OCP master using an OCP response 336 phase signal with the assistance of an AXI-to-OCP mapping logic module 338. The AXI Read Data 340 and AXI Read Response 320 are captured at the AXI interface 344. The response is then converted to an OCP protocol, and registered so that it can be driven to an OCP master. The OCP protocol used in a OCP-to-AXI bridge assumes that the targeted OCP master always accepts the data without waiting. An OCP master will not wait for the bridge. Therefore there is no need for the bridge to wait for an AXI slave on the AXI read data channel. Each read response uses the stored OCP_MTagID 332 information to drive the TagID FIFO 334. The OCP_MTagID 332 information is stored in the TagID FIFO 334 when a read request is received on the OCP Request Signals 302. Since reads are not allowed to be reordered, the tag IDs will be kept in order by the FIFO.

The outstanding write address FIFO 314, comparators 316, TagID FIFO 334, and some of the control logic 318 can be used to solve the request ordering problem that includes signals such as, but not limited to: AXI_ARREADY, AXI_AWREADY, AXI_WREADY, AXI write Response, AXI Read Response, Request FIFO Full or Empty and Write Data FIFO Full and/or Empty 320.

Figure 4A:
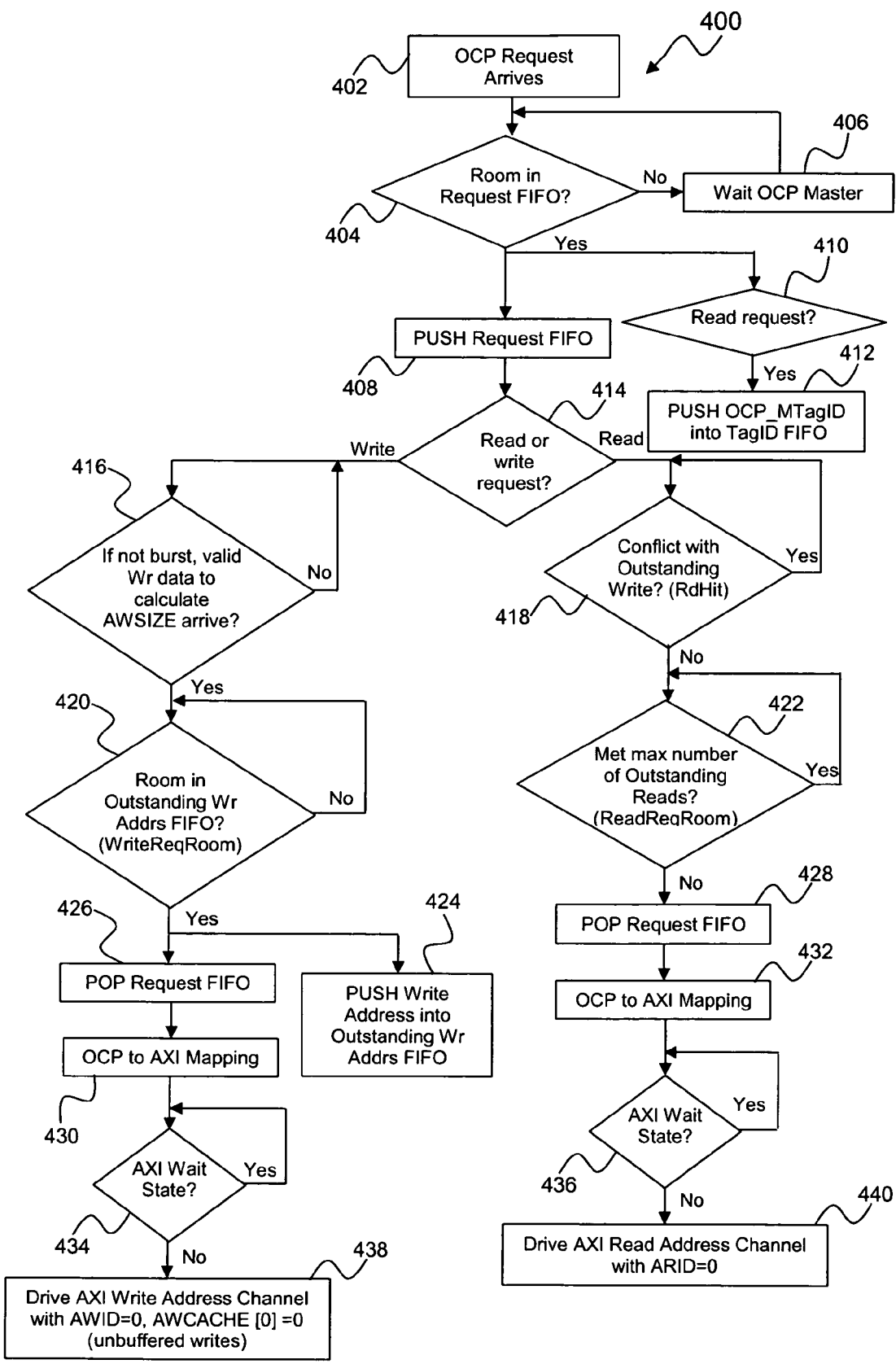
FIG. 4A illustrates a flow chart of an OCP-to-AXI bridge with Read and Write Request for use in request transaction ordering in OCP bus to AXI bus bridge designs, in accordance with a preferred embodiment.

FIG. 4A illustrates a flow chart of an OCP-to-AXI bridge 400 with Read and Write Request for use in request transaction ordering in OCP bus to AXI bus bridge designs, in accordance with a preferred embodiment. The OCP Request arrives as depicted at block 402. Next, as described at block 404 the OCP-to-AXI bridge checks if there is enough room in the Request FIFO. If the status is no, the OCP master is waited as indicated at block 406. The OCP-to-AXI bridge will go through this loop of block 404 and 406 and continue to wait the OCP master until there is room in the request FIFO. If status is yes there is room in the request FIFO at block 404, the request information is pushed into the Request FIFO as indicated at block 408 and the request is evaluated to see if it is a read request at block 410. If it is a read request, the OCP master OCP_MTagID signal information is pushed into the TagID FIFO at block 412. This information is saved to later return to the OCP master with the read data.

From PUSH request FIFO block 408 the stored information is checked for a read or write request as described at block 414. If a request constitutes a "write" request, then the request is checked if valid write data has arrived to calculate AWSIZE for non-burst transaction as indicated at block 416. If the request is a non-burst transaction and the write data has not arrive constituting a no condition, the OCP-to-AXI bridge will wait until write data arrives by repeating the block 416 evaluation. If the request is a burst transaction or a non-burst transaction with write data available, a yes condition is met.

If the status of block 416 is "yes," then the condition can be checked based on the room available in an outstanding Wr Addrs FIFO (WriteReqRoom) as described at block 420. If there is no room, the OCP-to-AXI bridge will wait until there is room by continuing to evaluate block 420. If a WriteReqRoom as depicted block 420 satisfies the request with a "yes" status, then the request is popped from the request FIFO as depicted at block 426 and the write address is pushed into an outstanding Wr Addrs FIFO as indicated at block 424. This saves the write address to be compared to future read request addresses for hazard checking. Thereafter, as depicted at block 430, an OCP to AXI mapping operation takes place. Next, as illustrated at block 434, if an AXI Wait state occurs due to an AXI slave component being busy, then the OCP-to-AXI bridge will wait until the AXI wait state is removed by continuing to evaluate block 434. When there is no AXI wait state, the data (i.e. based on the request) can be driven onto the AXI Write Address Channel with AWID=0, AWCACHE [0]=0 (un-buffered writes) as described at block 438. These AWID and AWCACHE settings are required by the OCP-to-AXI bridge to meet the OCP and AXI order policy rules.

If the request evaluated in block 414 is a read request, then the request is checked if there is a conflict with an outstanding Write (Rdhit) as described at block 418. This evaluation uses information of previous writes from the outstanding write address FIFO in block 424. If a conflict occurs the OCP-to-AXI bridge waits until the conflict is resolved by the outstanding write request in conflict being completed; When there is no conflict, the OCP-to-AXI bridge checks if the number of outstanding read requests has been met (ReadReqRoom) as described at block 422. This keeps the TagID FIFO from overflowing. If the maximum number of outstanding read requests have been reached, the OCP-to-AXI bridge waits. From the ReadReqRoom, the request can be popped from the Request FIFO (i.e. based on the status "no") as indicated at block 428. Thereafter, as depicted at block 432, an OCP-to-AXI mapping operation takes place. Next as described at block 436, if the AXI Wait state occurs due to an AXI slave being busy, then the OCP-to-AXI bridge will wait until the AXI wait state is removed by continuing to evaluate block 436. When there is no AXI wait state, the data (i.e. based on the request) is driven onto the AXI Read Address Channel with ARID=0 as described at block 440. The ARID setting is required by the OCP-to-AXI bridge to meet the OCP and AXI order policy rules.

Figure 4B:
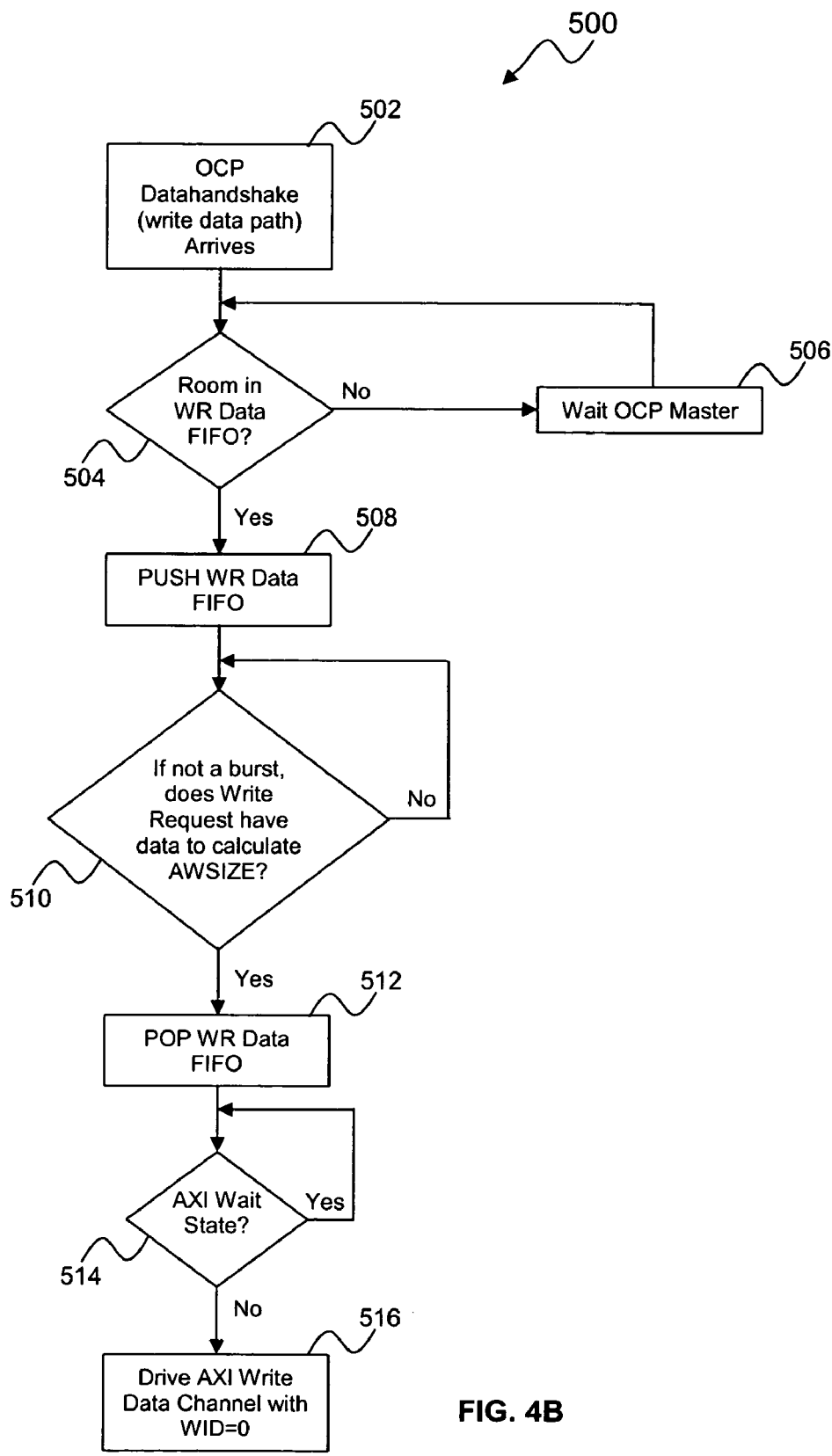
FIG. 4B illustrates a flow chart of an OCP-to-AXI bridge with Write Data for use in request transaction ordering in OCP bus to AXI bus bridge designs, in accordance with a preferred embodiment.

FIG. 4B illustrates a flow chart of an OCP-to-AXI bridge 500 with Write Data for use in request transaction ordering in OCP bus to AXI bus bridge designs, in accordance with a preferred embodiment. The write data from the OCP Data handshake signals arrives as depicted at block 502. The OCP-to-AXI bridge evaluates if there is room in the WR Data FIFO at block 504. If there is not room for write data then a wait state is sent to the OCP master as indicated at block 506 until there is room in the WR Data FIFO.

When there is room in the WR Data FIFO as indicated by a status condition yes at block 504, the write data is pushed onto the WR Data FIFO at block 508. Next as described at block 510, if it is not a burst transaction, does Write Request have data to calculate AWSIZE then if the status condition is no, the OCP-to-AXI bridge waits until the write request is available; otherwise the data is popped from the WR Data FIFO as indicated at block 512. Next, as described at block 514, if an AXI Wait state occurs due to an AXI slave being busy, then the OCP-to-AXI bridge will wait until the AXI wait state is removed by continuing to evaluate block 514. When there is no AXI wait sate, the write data can driven onto the AXI Write Data Channel with WID=0 as described at block 516. The WID setting is required by the OCP-to-AXI bridge to meet the OCP and AXI order policy rules.

Figure 4C:
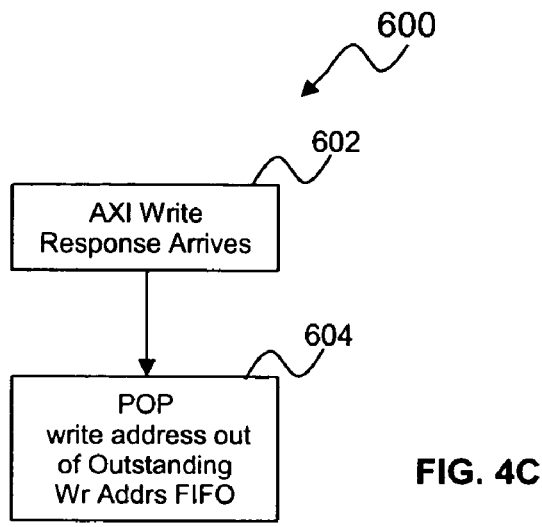
FIG. 4C illustrates a flow chart of an OCP-to-AXI bridge with Write Response for use in request transaction ordering in OCP bus to AXI bus bridge designs, in accordance with a preferred embodiment.

FIG. 4C illustrates a flow chart of an OCP-to-AXI bridge 600 with Write Response for use in request transaction ordering in OCP bus to AXI bus bridge designs, in accordance with a preferred embodiment. AXI Write response arrives as depicted at block 602. Next, as indicated at block 604, a write address is popped out of Outstanding Wr Addrs FIFO. This removes the write address from consideration of the read hazard check in block 418 since the write has completed.

Figure 4D:
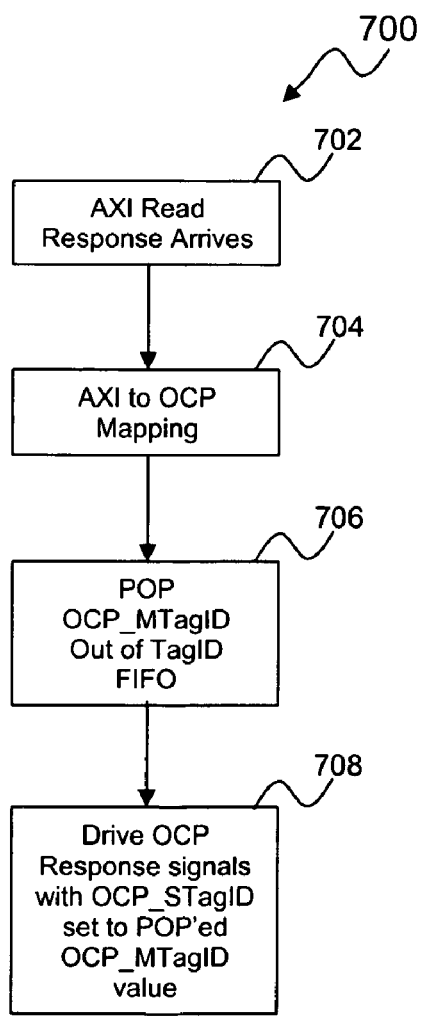
FIG. 4D illustrates a flow chart of an OCP-to-AXI bridge with Read Data and Response for use in request transaction ordering in OCP bus to AXI bus bridge designs, in accordance with a preferred embodiment.

FIG. 4D illustrates a flow chart of an OCP-to-AXI bridge 700 with Read Data and Response for use in request transaction ordering in OCP bus to AXI bus bridge designs, in accordance with a preferred embodiment. AXI Read Response arrives as depicted at block 702. Next, as indicated at block 704, the AXI to OCP Mapping is performed. Each read response uses an OCP_MTagID popped out of the TagID FIFO as indicated at block 706. Thereafter, as depicted at block 708 OCP Response signals are driven with OCP_STagID set to POP'ed OCP_MTagID value.

Figure 5:
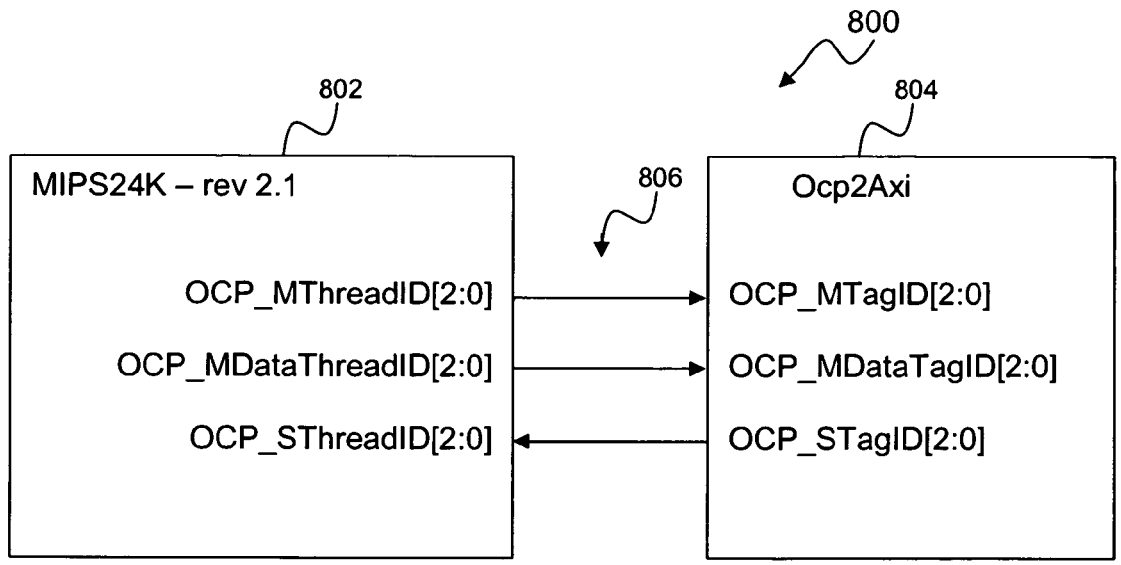
FIG. 5 illustrates a block diagram of an MIPS32 24Kf processor of revision 2.1 thread signal connections for use in request transaction ordering in OCP bus to AXI bus bridge designs, in accordance with a preferred embodiment.

FIG. 5 illustrates a block diagram 800 of an MIPS32 24Kf processor revision 2.1 using OCP revision 2.0 thread signal connection system for use in request transaction ordering in OCP bus to AXI bus bridge designs, in accordance with a preferred embodiment. System 800 generally includes an MIPS32 24Kf processor of revision 2.1 802 that contains an OCP revision 2.0 interface 806. The interface 806 uses thread signals as tags, and can be provided in the context of a single threaded, multiple transaction device. The MIPS24Kf of revision 2.1 802 includes thread signals such as, but not limited to the following: OCP_MThreadID[2:0], OCP_MDataThreadID[2:0] and OCP_SThreadID[2:0]. The tag signals in OCP-to-AXI bridge 804 consist of OCP_MTagID[2:0], OCP_MDataTagID[2:0] and/or OCP_STagID[2:0]. The thread signals and the tag signals can be interfaced with each other to allow the MIPS32 24Kf processor to utilize the OCP-to-AXI bridge.

Figure 6:
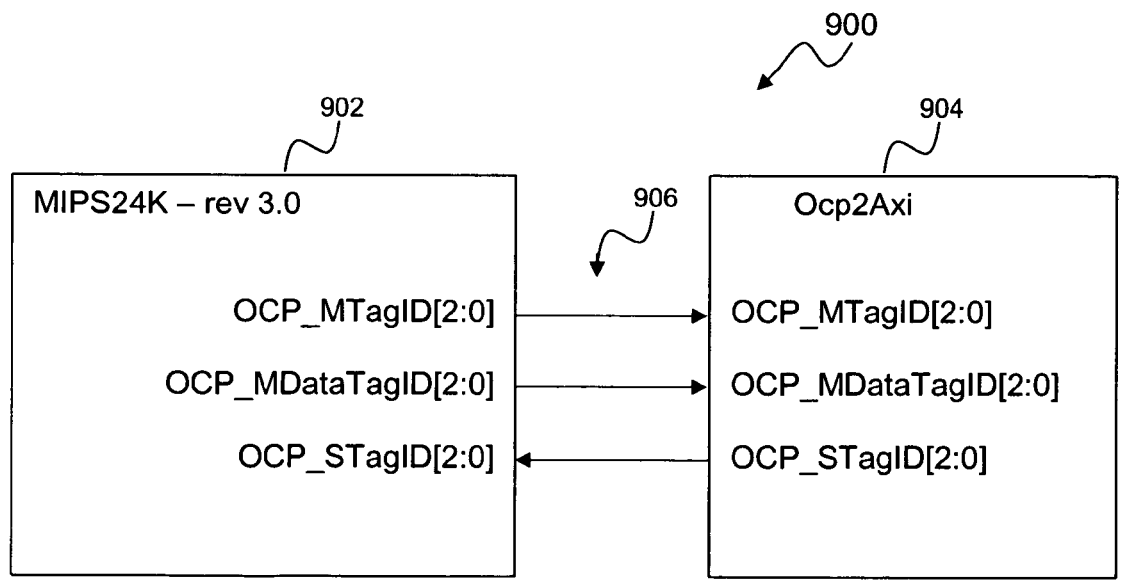
FIG. 6 illustrates a block diagram of a MIPS32 24Kf processor of revision 3.0 tag signal connections for use in request transaction ordering in OCP bus to AXI bus bridge designs, in accordance with a preferred embodiment.

FIG. 6, illustrates a block diagram 900 of an MIPS32 24Kf processor revision 3.0 using OCP revision 2.1 tag signal connection system for use with request transaction ordering in OCP bus to AXI bus bridge designs, in accordance with a preferred embodiment. System 900 includes an MIPS32 24Kf processor revision 3.0 and beyond that contains an OCP revision 2.1 interface 906. This interface 906 uses one thread and takes advantage of the OCP 2.1 tag signals for connecting signals. The MIPS24Kf revision 3.0 902 includes tag signals such as, but not limited to one or more of the following: OCP_MTagID[2:0], OCP_MDataTagID[2:0] and OCP_STagID[2:0]. The tag signals in OCP-to-AXI bridge 904 consist of OCP_MTagID[2:0], OCP_MDataTagID[2:0] and/or OCP_STagID[2:0]. The tag signals can be interfaced with each other to allow the MIPS32 24Kf processor to utilize the OCP-to-AXI bridge.

The features of the OCP-to-AXI bridge includes the request FIFO, OCP to AXI request mapping logic, AXI write and read address channel and write data channel output driving flops, Write Data FIFO, AXI to OCP read response mapping logic, control Logic for each FIFO push & pop control and OCP & AXI handshake signals. The features of the request ordering part of the bridge include a FIFO to hold the outstanding writes, comparators, FIFO to hold OCP read IDs, three control signals called RdHit, WriteReqRoom, and ReadReqRoom, and OCP to AXI mapping logic to force all writes to be un-buffered (response returned) and read and write AXI IDs to be identical. The depth of the outstanding write address FIFO is determined by the number of outstanding writes the user wants to support. The width of the outstanding write address FIFO can be determined by the number of address bits needed to support the "Hit" hazard checking range.

Three control signals are required to control when the request FIFO is "popped" to allow a request to go to the AXI bus. These signals are RdHit, WriteReqRoom and ReadReqRoom. In RdHit the read request is within for example a +/−16 data-beat range of an outstanding write request. This is generated by a sum (logical OR) of the outputs of the comparator logic. The comparators are comparing the current read request address to all outstanding write request addresses. In WriteReqRoom the outstanding write address FIFO is full, so another write request can not be sent on the AXI bus. This keeps the outstanding write address FIFO from overflowing. In ReadReqRoom the maximum number of outstanding reads has been reached and the TagID FIFO can be full, so another read request can not be sent on the AXI bus. This keeps the TagID FIFO from overflowing.

One comparator is generally required for each slot in the outstanding write address FIFO so that the addresses can be compared in parallel to each other. The number of bits to be compared by each comparator is generally equal to the width of the outstanding write address FIFO. The TagID FIFO holds the OCP IDs for the read requests. The depth of the TagID FIFO can be determined by the number of outstanding reads that the user wants to support plus the depth of the request FIFO plus one. The width of the TagID FIFO is generally determined by the width of the OCP MTagID bus. For the MIPS processor, the FIFO can be 3 bits wide. The OCP bus defines the ID width as a configurable number, so it can be anything that the user application requires. The generation of an "RdHit" signal from the comparators to stop a read request from being issued onto the AXI bus may occur. Additionally, the generation of a "WriteReqRoom" signal to stop write requests from being issued on the AXI bus when the outstanding write FIFO is full may also occur. Generation of "ReadReqRoom" signal to stop read requests from being issued on the AXI bus occurs when the ID FIFO is full may also occur.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A request transaction order processing method, comprising:
    applying an Open Core Protocol (OCP) to an Advanced eXtensible Interface (AXI) bus bridge for ordering request transactions in order to provide an OCP-to-AXI bridge;
    accepting read and write requests from an OCP bus; and
    converting said read and write requests to AXI read and write requests wherein an OCP posted write is converted to an AXI non-buffered write in order to provide enhanced request transaction ordering in a data-processing system.

2. The method of claim 1 wherein said OCP applied to said AXI bridge comprises a FIFO policy for requests.

3. The method of claim 1 wherein said OCP applied to said AXI bridge comprises an AXI write address channel, a read address channel and a write data channel output driving flip-flops.

4. The method of claim 1 wherein said OCP applied to said AXI bridge comprises a FIFO policy for writing data.

5. The method of claim 1 wherein said OCP applied to said AXI bridge comprises an AXI interface to an OCP for read response mapping logic operations.

6. The method of claim 1 further comprising a control logic circuit for controlling a plurality of FIFO policies for pushing and popping operations.

7. The method of claim 6 wherein said control logic circuit controls a plurality of handshake signals in said OCP and said AXI bridge.

8. The method of claim 1 wherein a request ordering portion of said AXI bridge uses a FIFO policy for holding an outstanding write, such that a depth of said FIFO policy is determined by a number of outstanding writes that a user desires to support.

9. The method of claim 1 wherein a request ordering portion of said AXI bridge uses a FIFO policy for holding an outstanding write, such that a width of said FIFO policy is determined by a plurality of address bits required to support a hazard checking range.

10. A request transaction order processing method, comprising:
applying an Open Core Protocol (OCP) to an Advanced eXtensible Interface (AXI) bus bridge for ordering request transactions in order to provide an OCP-to-AXI bridge, wherein said OCP applied to said AXI bridge comprises a FIFO request policy;
accepting read and write requests from an OCP bus; and
converting said read and write requests to AXI read and write requests wherein an OCP posted write is converted to an AXI non-buffered write in order to provide enhanced request transaction ordering in a data-processing system.

11. The method of claim 10 wherein said OCP applied to said AXI bridge comprises an AXI write address channel, a read address channel and a write data channel output driving flip-flops.

12. The method of claim 10 wherein said OCP applied to said AXI bridge comprises a FIFO policy for writing data.

13. A request transaction order processing system, comprising:
an Advanced eXtensible Interface (AXI) bus bridge;
an Open Core Protocol (OCP) applied to said Advanced eXtensible Interface (AXI) bus bridge in order to provide an OCP-to-AXI bridge, wherein an AXI to OCP mapping thereof allows all OCP and AXI protocols thereof to be met wherein an OCP posted write is converted to an AXI non-buffered write in order to provide enhanced request transaction ordering in a data-processing system.

14. The system of claim 13 further comprising a module for writing request information to a FIFO and control logic associated with said FIFO in order to allow an AXI wait state to be transferred back to an OCP master without losing requests.

15. The system of claim 13 further comprising a module for writing data to a FIFO and control logic associated with said FIFO in order to allow an AXI wait state to be transferred back to an OCP master without losing write data.

16. The system of claim 13 further comprising a module for implementing hazard checking of at least one read request to at least one outstanding write request via at least one comparator for writing addresses.

17. The system of claim 13 further comprising a module for driving all AXI write operations as un-buffered write operations in order to receive a response thereof for clearing a request from an outstanding write address FIFO.

18. The system of claim 13 further comprising a module for driving all AXI identification data to identical values thereof in order to prevent at least one read operation from being re-ordered and at least one write operation from being re-ordered.

19. The system of claim 13 further comprising at least one TagID FIFO for saving at least one OCP Tag ID for return to an OCP master with an associated read data and a response thereof.

20. The system of claim 13 further comprising a module for implementing hazard checking of at least one write request to at least one outstanding read request utilizing at least one comparator for reading at least one address stored in a FIFO.

* * * * *